United States Patent
Wang et al.

(10) Patent No.: US 10,350,961 B2
(45) Date of Patent: Jul. 16, 2019

(54) MULTI-MODE CABIN HEATING SYSTEM WITH DUAL HEATING SOURCE

(71) Applicant: MAHLE International GmbH, Stuttgart (DE)

(72) Inventors: Mingyu Wang, East Amherst, NY (US); Edward Wolfe, IV, Clarence Center, NY (US); Timothy Craig, East Amherst, NY (US); Prasad Kadle, Williamsville, NY (US)

(73) Assignee: MAHLE International GmbH, Stuttgart (DE)

(*) Notice: Subject to any disclaimer, the term of this patent is extended or adjusted under 35 U.S.C. 154(b) by 211 days.

(21) Appl. No.: 15/440,431

(22) Filed: Feb. 23, 2017

(65) Prior Publication Data

US 2018/0236843 A1    Aug. 23, 2018

(51) Int. Cl.
*B60H 1/03* (2006.01)
*B60H 1/00* (2006.01)
*B60H 1/04* (2006.01)
*B60H 1/22* (2006.01)

(52) U.S. Cl.
CPC ..... *B60H 1/00492* (2013.01); *B60H 1/00385* (2013.01); *B60H 1/00885* (2013.01); *B60H 1/2221* (2013.01); *B60H 2001/224* (2013.01)

(58) Field of Classification Search
CPC ............ B60H 1/00492; B60H 1/00385; B60H 1/00885; B60H 1/034; B60H 1/03; B60H 1/14; B60H 1/22; B60H 2001/224; B60H 2001/00121
USPC .................. 237/44, 12.3 B, 8 D; 165/202, 43
See application file for complete search history.

(56) References Cited

U.S. PATENT DOCUMENTS

| | | | | |
|---|---|---|---|---|
| 2,677,243 A | * | 5/1954 | Telkes | F25B 13/00 126/644 |
| 5,553,662 A | * | 9/1996 | Longardner | B60H 1/00492 165/10 |
| 5,762,266 A | * | 6/1998 | Okumura | B60H 1/00328 237/12.3 A |
| 6,854,513 B2 | | 2/2005 | Shirota et al. | |
| 7,266,967 B2 | | 9/2007 | Inoue et al. | |

(Continued)

FOREIGN PATENT DOCUMENTS

| | | |
|---|---|---|
| DE | 102005004397 A1 | 9/2005 |
| DE | 102014112343 A1 | 3/2015 |

(Continued)

*Primary Examiner* — Gregory L Huson
*Assistant Examiner* — Daniel E Namay
(74) *Attorney, Agent, or Firm* — Brinks Gilson & Lione

(57) ABSTRACT

A heating system for an automotive passenger cabin includes a blower fan generating an air flow; a first heater core downstream of the blower fan; a second heater core downstream of the first heater core; a coolant loop with a first branch and a second branch, wherein the first heater core is disposed in the first branch and the second heater core is disposed in the second branch; a change-over valve arrangement having a first setting establishing fluid communication between the first and second heater cores by connecting the first and second branches in two locations on opposite sides of the first and second heater cores. The change-over valve arrangement has a second setting separating the fluid communication between the first and second heater cores by disconnecting the first and second branches. The second branch or both the first and the second branch are connectable to a PCM heater.

15 Claims, 2 Drawing Sheets

(56) References Cited

U.S. PATENT DOCUMENTS

| | | | |
|---|---|---|---|
| 8,371,512 B2* | 2/2013 | Douarre | B60H 1/00278 237/12.1 |
| 9,242,530 B2 | 1/2016 | Goenka | |
| 9,400,510 B2* | 7/2016 | Wang | G05D 23/19 |
| 2003/0131611 A1* | 7/2003 | Oshitani | B60H 1/00885 62/90 |
| 2005/0167169 A1* | 8/2005 | Gering | B60H 1/00278 237/12.3 B |
| 2005/0224221 A1* | 10/2005 | Feuerecker | B60H 1/00914 165/202 |
| 2007/0170271 A1* | 7/2007 | Millard | B60H 1/00378 237/12 |
| 2009/0020620 A1* | 1/2009 | Douarre | B60H 1/00278 237/12.3 R |
| 2011/0120146 A1* | 5/2011 | Ota | B60H 1/00885 62/3.3 |
| 2012/0152511 A1* | 6/2012 | Chang | B60H 1/00428 165/202 |
| 2013/0074533 A1* | 3/2013 | Yagi | B60H 1/00492 62/129 |
| 2013/0192272 A1* | 8/2013 | Ranalli | F25B 21/04 62/3.3 |
| 2013/0199217 A1* | 8/2013 | Arai | B60H 1/00278 62/79 |
| 2014/0353392 A1* | 12/2014 | Park | B60H 1/00885 237/12.3 B |
| 2017/0274729 A1* | 9/2017 | Zandeh | B60H 1/00492 |
| 2017/0326949 A1* | 11/2017 | Omi | B60H 1/00 |
| 2018/0022185 A1* | 1/2018 | Kawano | B60H 1/22 165/202 |
| 2018/0201096 A1* | 7/2018 | Tsubouchi | F25B 15/16 |

FOREIGN PATENT DOCUMENTS

| | | | | |
|---|---|---|---|---|
| DE | 102014215891 A1 | | 2/2016 | |
| DE | 102015215424 A1 | | 2/2017 | |
| EP | 2 653 329 A1 | | 10/2013 | |
| JP | 02099422 A | * | 4/1990 | ......... B60H 1/00492 |
| JP | 06255345 A | * | 9/1994 | |
| JP | 2000301935 A | * | 10/2000 | ......... B60H 1/00328 |
| JP | 2013193709 A | * | 9/2013 | |
| JP | 2016107931 A | * | 6/2016 | ............... B60H 1/00 |

* cited by examiner

MULTI-MODE CABIN HEATING SYSTEM WITH DUAL HEATING SOURCE

GOVERNMENT RIGHTS

This invention was made with Government support under contract no. DE-EE0006444 awarded by the Department Of Energy. The Government has certain rights in this invention.

TECHNICAL FIELD

The current application relates to a heater system for a passenger cabin of an automotive vehicle, in particular a hybrid or electrical vehicle.

BACKGROUND

Climate control poses a severe challenge for environmentally friendly vehicles, including battery electric vehicles (BEVs), plug-in hybrid electric vehicles (PHEVs), extended range electric vehicles (EREVs), and even hybrid electric vehicles (HEVs). Cabin heating, depending on the size of the vehicle and the environmental conditions, typically requires 3.2 to 6.5 kW of battery power at the ambient of −10° C. (a nominal design point for heating) to meet transient and steady state comfort requirements. For the larger sized electric vehicles of various genres (xEV), the required electrical power for heating from the traction battery may be even greater. The battery power used to generate the heating, either through a heat pump or direct resistive heating, leads to dramatic decrease in the driving range of xEVs. It is estimated that the driving range of a BEV can be reduced by 20-50%, depending on the drive cycle.

Electric heaters generally consume a significant amount of energy stored in the traction battery. Range reduction is a widely recognized shortcoming of the technology. In BEVs and PHEVs, a common heating technology is a PTC heater (Positive-thermal-coefficient heater) that is configured to be part of an air circuit or coolant circuit.

It is also known that hot coolant storage has been used to assist with cabin heating. In these systems, an electric heater feeds heat energy to the coolant in an insulated storage tank while the vehicle is stationarily connected to an external electric power source. The heat is then stored in the coolant for later use. While coolant energy storage can help reduce the load on the traction battery while in operation, it has a limited capacity to sustain heating and is thus insufficient for extended trips.

SUMMARY

It is therefore desirable to develop a reliable, cost-competitive, and more energy-efficient occupant heating system that can help reduce the load on the traction battery and increase the vehicle electrical driving range while still ensuring occupant comfort.

According to a first aspect of the present invention, a heating system for a passenger cabin of an automotive vehicle includes a blower fan generating an air flow; a first heater core downstream of the blower fan with respect to the air flow; a second heater core downstream of the first heater core with respect to the air flow; a coolant loop with a first branch and a second branch, wherein the first heater core is disposed in the first branch and the second heater core is disposed in the second branch; a change-over valve arrangement having a first setting establishing fluid communication between the first and second heater cores by connecting the first and second branches in two locations on opposite sides of the first and second heater cores. The change-over valve arrangement has a second setting separating the fluid communication between the first and second heater cores by disconnecting the first and second branches.

The change-over valve arrangement provides flexibility for optimizing cabin heating in an energy-saving manner.

According to a further aspect of the invention, the first branch includes a first inlet section and a first outlet section, the first inlet section extending from the first heater core to the first location and the first outlet section extending from the first heater core to the second location. The heating system may include a first heating circuit extending from the first outlet section to the first inlet section. The first heating circuit advantageously includes a phase-change-material (PCM) heat exchanger and a first check valve adjacent the first inlet section blocking a coolant flow from the first inlet section toward the phase-change-material heat exchanger. This allows the PCM heat exchanger to be connected to the first heating core or to both the first and second heating cores.

According to a further aspect of the invention, the first heating circuit includes a first coolant heating arrangement; a first coolant pump with a pressure side connectable to an inlet of the phase-change-material heat exchanger; and a state valve having a first position that places an outlet of the phase-change-material heat exchanger in line with an inlet of the first coolant heating arrangement and with the suction side of the first coolant pump, and a second position that places the outlet of the phase-change-material heat exchanger in line with the first check valve. This set-up allows for heating the coolant while the vehicle has access to an external electrical power source, especially where the first coolant heater is an electric heater.

According to yet another aspect of the present invention, the first heating circuit further includes an analog feed valve having a plurality of positions between a first extreme setting exclusively connect the pressure side of the first coolant pump with an inlet of the phase-change-material heat exchanger and a second extreme setting connecting the pressure side of the first coolant pump with the first check valve, the plurality of positions allocating portions of coolant from the pressure side to the phase-change-material heat exchanger and to the check valve. The feed valve allows for circulating a full coolant flow in a smaller loop during operation of the first coolant heater.

According to a further aspect of the invention, the second branch includes a second inlet section and a second outlet section, the second inlet section extending from the second heater core to the first location and the second outlet section extending from the second heater core to the second location. Advantageously, the heating system further includes a second heating circuit extending from the second outlet section to the second inlet section. The second heating circuit includes a second coolant heating arrangement, a second check valve adjacent the second inlet section blocking a coolant flow from the second inlet section toward the second coolant heating arrangement. This arrangement allows for electric heating of the coolant to support or replace the heating capacity of the PCM heat exchanger by applying power to the second heating arrangement.

For reducing the number of components, the second coolant heating arrangement and the first coolant heating arrangement may be integrated into one electric coolant heater that, for example, may be a positive-thermal-coefficient heater (PTC heater). Even if the first and second coolant heaters are separate, the second coolant heating arrangement is preferably an electric positive-thermal-coefficient heater.

For circulation of coolant within the second heating circuit, the second heating circuit further includes a second coolant pump between the second outlet section and the second coolant heating arrangement. The second coolant pump has a pressure side connected to an inlet of the second coolant heating arrangement and a suction side connectable to the second outlet section.

To enable the second heating circuit to provide heat to other vehicle components unrelated to the cabin-heating function, the second heating circuit further includes a bypass line with a bypass valve, the bypass line being connected to an outlet of the second coolant heating arrangement, wherein the bypass valve has a first position connecting the suction side of the second coolant pump with the second outlet section to draw coolant from the HVAC heater core, and a second position connecting the suction side of the second coolant pump with the bypass line. The bypass line allows coolant to continue to flow when the second coolant heating arrangement is disconnected from the first and second heater cores so as to provide uninterrupted heat supply to other vehicle components that depend on the second heating circuit for heating needs.

This arrangement allows the heating system to have a charging mode, in which the state valve is in the first position of the state valve; the first coolant heating arrangement is powered by an external electric power source; and the first coolant pump is pumping coolant into the inlet of the phase-change-material heat exchanger, wherein the coolant exiting the outlet of the phase-change-material heat exchanger flows through the first coolant heating arrangement to the inlet of the first coolant pump.

The arrangement further allows the heating system to have a phase-change-material heat exchanger discharging mode, in which the state valve is in the second position of the state valve; the first coolant heating arrangement is disconnected from the external electric power source; the change-over valve arrangement is in the first position of the change-over valve arrangement; and the first coolant pump is pumping coolant into the inlet of the phase-change-material heat exchanger as proportioned by the feed valve to meet specific temperature target at the first heating circuit check valve location. The coolant exiting the outlet of the phase-change-material heat exchanger is remixed with the bypassed portion of coolant flow and then flows through the first check valve into the first and second branches of the coolant loop.

The arrangement further allows the heating system to have an energy recovery mode, in which the state valve is in the second position of the state valve; the first coolant heating arrangement is disconnected from the external electric power source; the change-over valve arrangement is in the second position of the change-over valve arrangement to separate the two heater cores into separate coolant branches. The first coolant pump pumps coolant into the inlet of the phase-change-material heat exchanger so that the coolant exiting the outlet of the phase-change-material heat exchanger flows through the first check valve into the first branch of the coolant loop with temperature control provided by the feed valve by bypassing a portion of the coolant flow to a remix position in front of the first check valve. At the same time, the second coolant pump pumps coolant into the inlet of the second coolant heating arrangement, wherein the coolant exiting the outlet of the second coolant heating arrangement flows through the second check valve into the second branch of the coolant loop to provide heat to the second heater core. This mode is useful to extract low grade heat from the phase-change-material to preheat incoming cold air through the first heater core, and use the second heater core to further raise the air temperature to meet air discharging temperature target. The second heater core relies on the second heating arrangement for high temperature coolant by using electric power from the traction battery while driving on the road.

The arrangement further allows the heating system to have a non-phase-change-material heating mode, in which the state valve is in the first position of the state valve; the first coolant heating arrangement is disconnected from the external electric power source; the first coolant pump is commanded to a rest state; the change-over valve arrangement is in the first position of the change-over valve arrangement; and the second coolant pump is commanded to pump coolant into the inlet of the second heater core through the second check valve, wherein the coolant exiting the outlet of the second heater core returns to the second coolant pump suction side by setting the bypass valve to non-bypass position. In this mode, the second heating arrangement provides heating using traction battery to both the first heater core and second heater core without using any heat from the PCM heat exchanger.

Further details and benefits will become apparent from the following description of the appended drawings.

BRIEF DESCRIPTION OF THE DRAWINGS

The drawings are provided purely for illustrative purposes and are not intended to limit the scope of the present invention.

In the drawings.

DETAILED DESCRIPTION OF THE DRAWINGS

Figure 1:
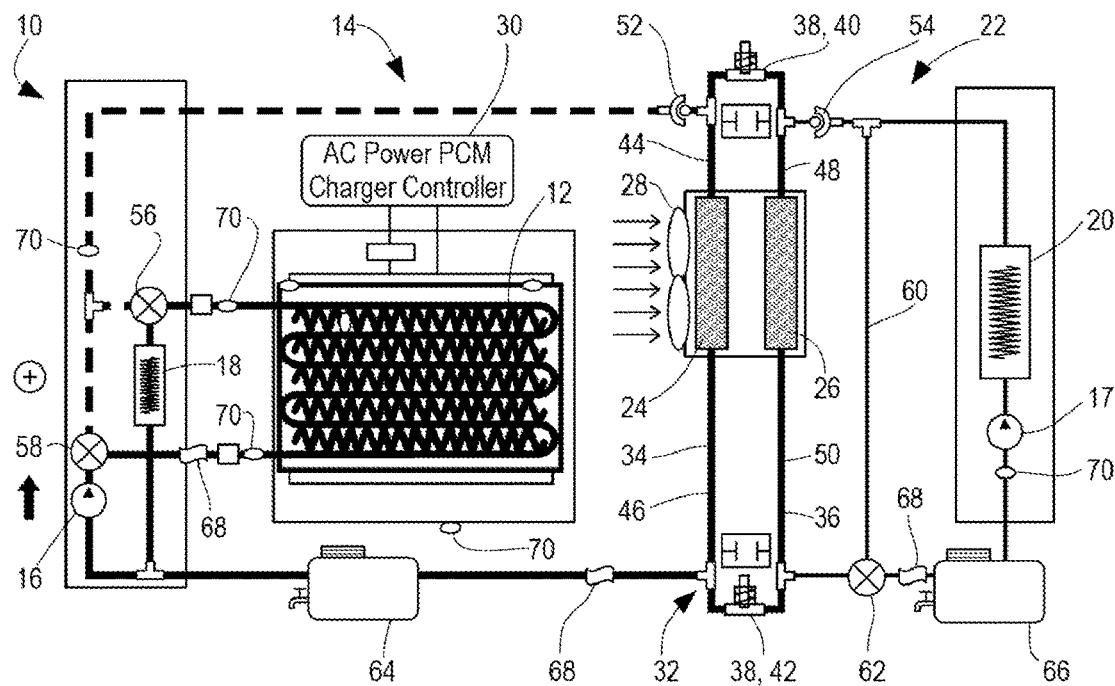
FIG. 1 shows a cabin heating system with dual heating source in a charging mode.

FIGS. 1-4 show a heating system 10 for a cabin of an automotive vehicle, in particular an environmentally friendly vehicle. The heating system 10 shown in FIGS. 1 through 4 is designed to store heat using power from the electric grid while stationary and to release the heat during travel in low-temperature ambient conditions to warm up the vehicle cabin.

A phase-change material (PCM) heat exchanger 12 is connected to a first heating circuit 14 of the shown heating system 10. The PCM heat exchanger 12 contains a PCM heat storage medium and internal heat transfer surfaces that allow heat to be added to the PCM medium using electric heaters, or removed from the PCM medium by circulating a low temperature coolant stream. A first coolant pump 16 is arranged to provide pressure head for coolant circulation through the PCM heat exchanger 12. The first heating circuit 14 further includes a first coolant heater 18 for heating the PCM medium while stationarily connected to an external electric power source (not shown).

A second coolant heater 20 is arranged in a second heating circuit 22. At least the second coolant heater 20, which is typically operated while the vehicle is traveling, is advantageously a positive-temperature-coefficient (PTC) heater. It should be noted in this context, however, that, although the description discusses a first coolant heater 18 and a second coolant heater 20, the distinction is a functional one, and the first coolant heater 18 and the second coolant heater 20 may be first and second coolant heating arrangements physically integrated into one electric heater because, as will be discussed below, the first and second coolant heaters 18 and 20 operate at different times so that the two functions do not interfere with each other. Accordingly, the PTC heater may be in fluid communication with the first heating circuit 14 as the first coolant heater 18 while the vehicle is stationarily connected to the electric power source and in fluid communication with the second heating circuit 22 as the second coolant heater 20 while the vehicle is traveling.

FIGS. 1-4 show a system that also incorporates a configurable cabin heater with a front heater core 24 and a rear heater core 26 with a blower fan 28 generating an airflow through the cabin heater, where in the present description, the front heater core 24 is proximate to the blower fan 28 and the rear heater is remote from the blower fan 28 so that the airflow generated by the blower fan 28 passes through the front heater core 24 before passing through the rear heater core 26. Various valves, the PCM heat exchanger 12, the first and second coolant pumps 16 and 17, and the first and second coolant heaters 18 and 20, are parts of the system that can be controlled by an electronic controller 30, e.g. a microcontroller, to achieve various modes of operation.

The arrangement of the individual functional elements will now be described in connection with FIG. 1. At the center of the heating system 10 is the blower fan 28 generating the air flow, a first heater core 24, which is the front heater core 24, downstream of the blower fan 28 with respect to the air flow, a second heater core 26, which is the rear heater core 26, downstream of the front heater core 24 with respect to the air flow. The front heater core 24 and the rear heater core 26 are disposed in a coolant loop 32 with a first branch 34 and a second branch 36. The first heater core 24 is disposed in the first branch 34 and the second heater core 26 is disposed in the second branch 36.

A change-over valve arrangement 38 includes two change-over valves 40 and 42 connecting the first branch 34 with the second branch 36 in two locations with a first change-over valve 40 on a first side of the first and second heater cores 24 and 26 and a second change-over valve 42 in a second location on a second side of the first and second heater cores 24 and 26, opposite the first side. The change-over valve arrangement 38 has a second setting, in which the first and second change-over valves 40 and 42 are both closed, thus separating the fluid communication between the front and rear heater cores 24 and 26 by disconnecting the first and second branches 34 and 36 in the first and second locations.

The locations of the change-over valves 40 and 42 on the opposite sides of the coolant loop 32 designate functional locations in the coolant loop 32, not physical locations of the first and second change-over valves 40 and 42. For example, as the first and second change-over valves 40 and 42 are switched between their settings simultaneously, these valves may be accommodated in a common housing and share a common actuating mechanism, such a solenoid actuator.

Within the coolant loop 32, the first branch 34 has a first inlet section 44 and a first outlet section 46. The first inlet section 44 extends from the first change-over valve 40 to the inlet of the first heater core 24, and the first outlet section 46 extends from the outlet of the first heater core 24 to the second change-over valve 42. Likewise, the second branch 36 has a second inlet section 48 and a second outlet section 50. The second inlet section 48 extends from the second change-over valve 42 to the inlet of the second heater core 26, and the second outlet section 50 extends from the outlet of the second heater core 26 to the second change-over valve 42.

The heating system 10 further includes the first heating circuit 14 extending from the first outlet section 46 to the first inlet section 44. The first heating circuit 14 includes the PCM heat exchanger 12 the first coolant heater 18; and the first coolant pump 16 with a pressure side connectable to an inlet of the PCM heat exchanger 12

A first check valve 52 adjacent the first inlet section 44 blocks a coolant flow from the first inlet section 44 into the first heating circuit 14 toward the PCM heat exchanger 12, while allowing coolant to flow from the PCM heat exchanger 12 into the first inlet section 44. A second check valve 54 adjacent the second inlet section 48 blocks a coolant flow from the second inlet section 48 into the second heating circuit 22 toward the second coolant heater 20, while allowing coolant to flow from the second coolant heater 20 into the first inlet section 44.

A three-way state valve 56 is connected to the outlet of the PCM heat exchanger 12, to the first check valve 52, and to the outlet of the first coolant heater 18. The state valve 56 has a first position that places the outlet of the PCM heat exchanger 12 in line with the inlet of the first coolant heater 18 and thus with the suction side of the first coolant pump 16. In a second position of the state valve 56, the outlet of the PCM heat exchanger 12 is placed in line with the first check valve 52.

The first heating circuit 14 further includes an analog feed valve 58 that has a plurality—or an infinite number—of positions between a first extreme setting exclusively connecting the pressure side of the first coolant pump 16 with an inlet of the PCM heat exchanger 12 and a second extreme setting connecting the pressure side of the first coolant pump 16 with the first check valve 52 to allow at least a portion of the pumped coolant to bypass the PCM heat exchanger 12. The feed valve 58 allocates adjustable portions of coolant from the pressure side of the first coolant pump 16 to the PCM heat exchanger 12 and to the check valve.

The second heating circuit 22 includes a bypass line 60 with a bypass valve 62. The bypass line 60 extends in parallel to the part of the second heating circuit 22 that includes the second coolant pump 17 and the second coolant heater 20. The bypass valve 62 connects the suction side of the coolant pump 17 either completely to the second outlet section 50, or completely to the inlet of the second check valve to allow the total by pass of the second heater core A first coolant reservoir 64 is arranged between the first outlet section 46 and the suction side of the pump, and a second coolant reservoir 66 is arranged between the second outlet section 50 and the suction side of the second coolant pump 17. Various flow meters 68 and temperature sensors 70 (thermistors) are located in the first heating circuit 14 and the second heating circuit 22 for providing information to the electronic controller 30. Further, pressure sensors are located at the inlet and at the outlet of the PCM heat exchanger 12. Suitable insulation surrounds every heating arrangement, the front and rear heater cores 24 and 26, as well as the PCM heat exchanger 12 to minimize unwanted heat loss to the environment.

FIG. 1 shows a first mode of operation, which is a charging mode that is executed while the vehicle is stationary and connected to an external electric power supply for charging the vehicle's traction battery. In the charging mode, the state valve 56 is in the first position of the state valve 56, in which the state valve 56 connects the outlet of the PCM heat exchanger 12 with the first coolant heater 18. The encircled "+" next to the first coolant heater 18 indicates that the first coolant heater 18 is being powered by the external power source to generate heat. The arrow next to the first coolant pump 16 indicates that the pump is pumping coolant to the inlet of the PCM heat exchanger 12.

If a feed valve 58 is present as in the shown embodiment, the feed valve 58 is in a position to direct all of the coolant exiting the pressure side of the first coolant pump 16 to the inlet of the PCM heat exchanger 12, so the heated coolant can most efficiently heat the PCM coolant inside the PCM heat exchanger 12.

The symbols next to the first and second change-over valves 40 and 42 indicate that these valves are closed to separate the suction side of the first coolant pump 16 from the second heating circuit 22. This will minimize coolant migration to the second heating circuit while the PCM heat exchanger is getting charged. In the charging mode, the first coolant pump 16 may be operated with a variable duty cycle properly chosen between 1% to 100% to meet the minimum coolant flow requirement to deliver heat to the PCM heat exchanger. The coolant flow rate may be varied according to various control criteria. For example, it may be controlled according to the heating power to the first coolant heater.

Figure 2:
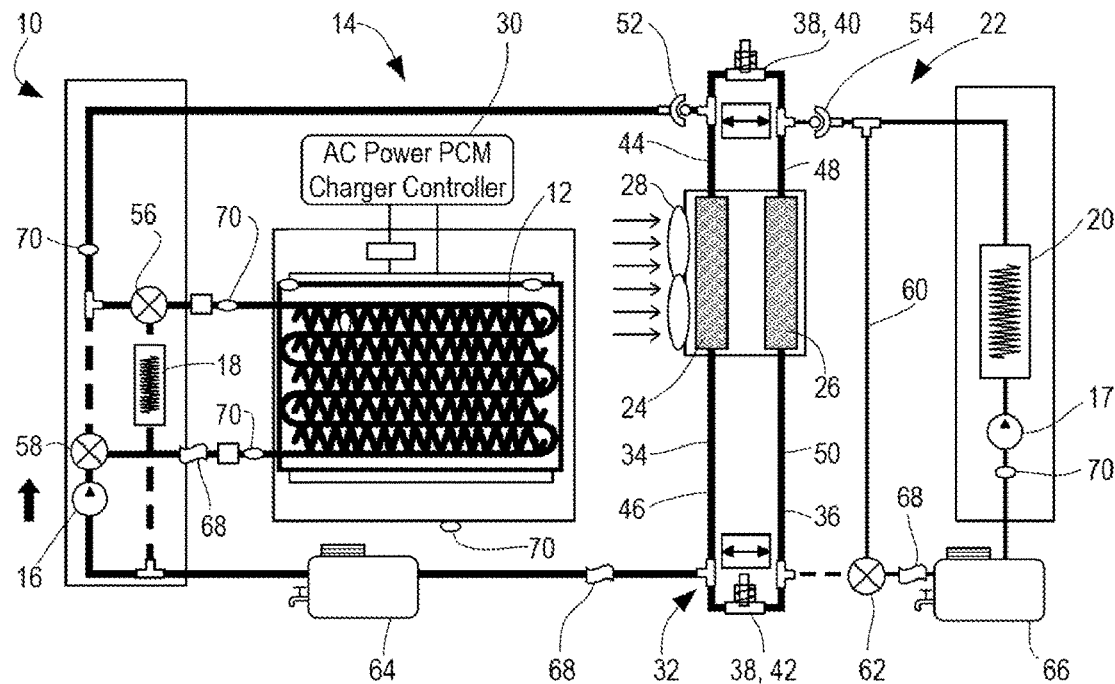
FIG. 2 shows the cabin heating system of FIG. 1 in a discharging mode.

FIG. 2 shows the heater system of FIG. 1 in a second mode, the thermal discharging mode, in which circulating coolant heated by the PCM coolant in the PCM heat exchanger 12 is circulated through the first and second heater cores 24 and 26 while the vehicle is remote from the external electrical power source. The change-over valve arrangement 38 establishes a fluid communication between the first and second branches 34 and 36 of the coolant loop 32. In the discharging mode, the state valve 56 connects the outlet of the PCM heat exchanger 12 with the first check valve 52 and not with the first coolant heater 18. The first coolant heater 18 is turned off and disconnected from the external power source.

The feed valve 58 may be adjusted to provide a partial flow of non-heated coolant to the first check valve 52, where this non-heated coolant directly from the first coolant pump 16 is mixed with the coolant heated by the PCM heat exchanger 12 to regulate the coolant temperature going to the first and second heater cores 24 and 26. The proportion of the non-heated stream is determined by the feed valve 58 downstream of the first coolant pump 16. Linear control or ON-OFF cycling control may be implemented to control the coolant temperature entering the coolant loop 32 by using the temperature sensor 70 between the feed valve 58 and the first check valve 52 as feedback. It is also possible to use the air temperature measured downstream of the second heater core 26 to control the mixing temperature of the coolant. Meanwhile, in the second heating circuit 22, the bypass valve 62 is used to allow the second heating circuit 22 to continue serving other needs of the vehicle unrelated to heating the cabin, for example, for heating the traction battery of the vehicle (not shown).

Figure 3:
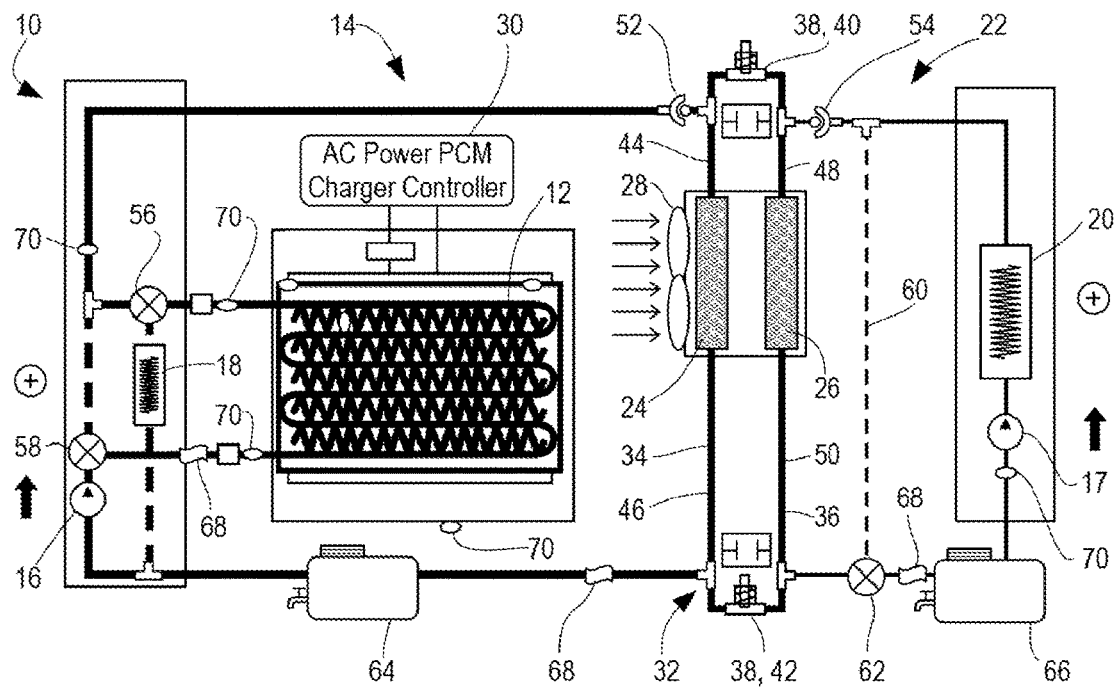
FIG. 3 shows the cabin heating system of FIG. 1 in an energy recovery mode.

FIG. 3 shows a third mode of the heating system 10, the energy recovery mode. As the first heating circuit 14 continues operation to the point, where even 100% coolant flow going through the PCM heat exchanger 12 fails to provide the required air discharge temperature downstream of the second heater core 26, the PCM heat exchanger 12 is conventionally considered exhausted because it is unable to provide sufficient cabin heating on its own. This normally happens when the coolant temperature exiting from the PCM heat exchanger 12 becomes too low, such as less than 60° C. However, at an ambient temperature of −10° C. or lower, there is still residual thermal energy left in the PCM coolant from the PCM heat exchanger 12 that can be used to pre-heat the incoming cold air.

The energy recovery mode allows the first and second heater cores 24 and 26 to function separately in the first heating circuit 14 and the second heating circuit 22, with the first heater core 24 providing pre-heating of cold air, using the coolant from the PCM heat exchanger 12 and the second heater core 26 further heating the air downstream from the first heater core 24, using the second coolant heater 20, such as a PTC heater. To this end, the second coolant heater 20 is powered up to provide resistance heating, and the second coolant pump 17 pumps coolant through the second coolant heater 20 into the second heater core 26. The change-over valve arrangement 38 separates the first branch 34 from the second branch 36 of the coolant loop 32 so that the first and second heating circuits 20 and 22 operate separately, each providing coolant to one of the first and second heater cores 24 and 26. Under the nominal ambient condition of −10° C., it is expected that energy extraction from the first heating circuit 14 is possible in a cabin air partial recirculation setting when the coolant temperature is above 20° C. In an outside air setting of the climate control system, further extraction down to 0° C. may be possible.

Figure 4:
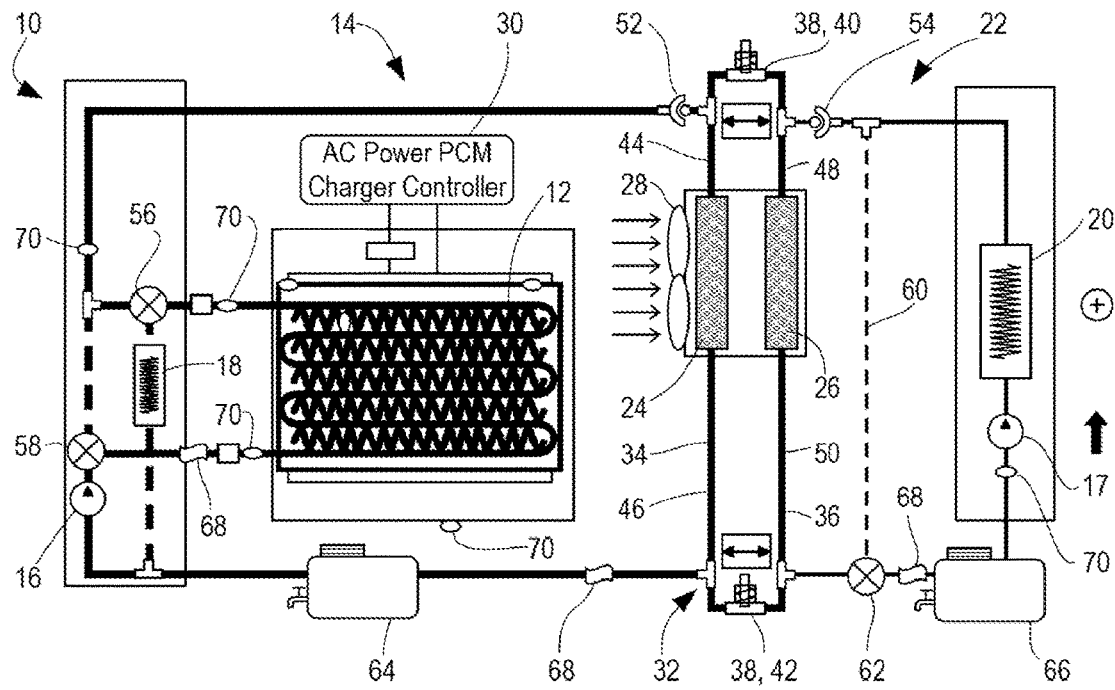
FIG. 4 shows the cabin heating system of FIG. 1 in a non-phase-change-material heating mode.

FIG. 4 shows a fourth mode of the heating system 10, the non-phase-change-material heating mode. When the PCM heat exchanger 12 is truly exhausted by energy recovery extraction such that it is meaningless to continue circulate coolant in the first heating circuit 14, the first heater core 24 and the second heater core 26 of the cabin heater are placed in fluid communication with the second heating circuit 22 by opening the first and second change-over valves 40 and 42 to let the second coolant heater 20 provide all the heating needed to bring the coolant to a desired temperature. The first coolant pump 16 can be turned off because further operation does not benefit the desired heating function. The non-phase-change-material heating mode continues to heat the cabin to the desired temperature and further continues for maintaining the temperature.

While the above description constitutes the preferred embodiments of the present invention, it will be appreciated that the invention is susceptible to modification, variation and change without departing from the proper scope and fair meaning of the accompanying claims.

What is claimed is:
1. A heating system for a passenger cabin of an automotive vehicle, the heating system comprising:
a blower fan generating an air flow;
a first heater core downstream of the blower fan with respect to the air flow;
a second heater core downstream of the first heater core with respect to the air flow;
a coolant loop with a first branch and a second branch, wherein the first heater core is disposed in the first branch and the second heater core is disposed in the second branch;
a change-over valve arrangement,
wherein the change-over valve arrangement has a first setting establishing fluid communication between the first and second heater cores by connecting the first and second branches in a first location on a first side of the first and second heater cores and in a second location on a second side of the first and second heater cores, the second side being opposite the first side, and wherein the change-over valve arrangement has a second setting separating the fluid communication between the first and second heater cores by disconnecting the first and second branches in the first and second locations.

2. The heating system of claim 1, wherein the first branch comprises a first inlet section and a first outlet section, the first inlet section extending from the first heater core to the first location and the first outlet section extending from the first heater core to the second location, the heating system further comprising a first heating circuit extending from the first outlet section to the first inlet section, the first heating circuit comprising:
a phase-change-material heat exchanger; and
a first check valve adjacent the first inlet section blocking a coolant flow from the first inlet section toward the phase-change-material heat exchanger.

3. The heating system of claim 2, further comprising:
a first coolant heating arrangement;
a first coolant pump with a pressure side connectable to an inlet of the phase-change-material heat exchanger; and
a state valve having a first position that places an outlet of the phase-change-material heat exchanger in line with an inlet of the first coolant heating arrangement and with the suction side of the first coolant pump, and a second position that places the outlet of the phase-change-material heat exchanger in line with the first check valve.

4. The heating system of claim 3, wherein the first coolant heater is an electric heater.

5. The heating system of claim 3, wherein the first heating circuit further comprises an analog feed valve having a plurality of positions between a first extreme setting exclusively connect the pressure side of the first coolant pump with an inlet of the phase-change-material heat exchanger and a second extreme setting connecting the pressure side of the first coolant pump with the first check valve, the plurality of positions allocating portions of coolant from the pressure side to the phase-change-material heat exchanger and to the check valve.

6. The heating system of claim 3, wherein the second branch comprises a second inlet section and a second outlet section, the second inlet section extending from the second heater core to the first location and the second outlet section extending from the second heater core to the second location, the heating system further comprising a second heating circuit extending from the second outlet section to the second inlet section, the second heating circuit comprising:
a second coolant heating arrangement; and
a second check valve adjacent the second inlet section blocking a coolant flow from the second inlet section toward the second coolant heating arrangement.

7. The heating system of claim 6, wherein the second coolant heating arrangement and the first coolant heating arrangement are integrated into one electric coolant heater.

8. The heating system of claim 7, wherein the one electric coolant heater is a positive-thermal-coefficient heater.

9. The heating system of claim 6, wherein the second heating circuit further includes a second coolant pump between the second outlet section and the second coolant heating arrangement, the second coolant pump having a pressure side connected to an inlet of the second coolant heating arrangement and a suction side connectable to the second outlet section.

10. The heating system of claim 9, wherein the second coolant heating arrangement is an electric positive-thermal-coefficient heater.

11. The heating system of claim 9, wherein the second heating circuit further includes a bypass line with a bypass valve, the bypass line being connected to an outlet of the second coolant heating arrangement at one end remote from the bypass valve, wherein the bypass valve has a first position connecting the suction side of the second coolant pump with the second outlet section and a second position connecting the suction side of the second coolant pump with the bypass line.

12. The heating system of claim 11, configured to have a charging mode, in which
the state valve is in the first position of the state valve;
the first coolant heating arrangement is powered by an external electric power source; and
the first coolant pump pumps coolant into the inlet of the phase-change-material heat exchanger, wherein the coolant exiting the outlet of the phase-change-material heat exchanger flows through the first coolant heating arrangement to the inlet of the first coolant pump.

13. The heating system of claim 11, configured to have a thermal discharging mode, in which
the state valve is in the second position of the state valve;
the first coolant heating arrangement is disconnected from the external electric power source;
the change-over valve arrangement is in the first position of the change-over valve arrangement; and
the first coolant pump pumps coolant into the inlet of the phase-change-material heat exchanger, wherein the coolant exiting the outlet of the phase-change-material heat exchanger flows through the first check valve into the first and second branches of the coolant loop.

14. The heating system of claim 11, configured to have an energy recovery mode, in which
the state valve is in the second position of the state valve;
the first coolant heating arrangement is disconnected from the external electric power source;
the change-over valve arrangement is in the second position of the change-over valve arrangement;
the first coolant pump pumps coolant into the inlet of the phase-change-material heat exchanger, wherein the coolant exiting the outlet of the phase-change-material heat exchanger flows through the first check valve into the first branch of the coolant loop;
the second coolant pump pumps coolant into the inlet of the second coolant heating arrangement, wherein the coolant exiting the outlet of the second coolant heating arrangement flows through the second check valve into the second branch of the coolant loop.

15. The heating system of claim 11, configured to have a non-phase-change-material heating mode, in which
the state valve is in the first position of the state valve;
the first coolant heating arrangement is disconnected from the external electric power source;
the change-over valve arrangement is in the first position of the change-over valve arrangement; and
the first coolant pump is de-powered, and the second coolant pump is operated to pump coolant into the inlet of the second heating arrangement, wherein the coolant exiting the outlet of the second heating arrangement flows through the second check valve into the first and second branches of the coolant loop.

* * * * *